(12) United States Patent
Brook

(10) Patent No.: US 12,124,930 B2
(45) Date of Patent: Oct. 22, 2024

(54) VEHICLE RESILIENCY, DRIVING FEEDBACK AND RISK ASSESSMENT USING MACHINE LEARNING-BASED VEHICLE WEAR SCORING

(71) Applicant: BlueOwl, LLC, San Francisco, CA (US)

(72) Inventor: Callum Brook, Piedmont, CA (US)

(73) Assignee: QUANATA, LLC, San Francisco, CA (US)

(*) Notice: Subject to any disclaimer, the term of this patent is extended or adjusted under 35 U.S.C. 154(b) by 0 days.

(21) Appl. No.: 18/321,228

(22) Filed: May 22, 2023

(65) Prior Publication Data

US 2023/0289663 A1  Sep. 14, 2023

Related U.S. Application Data

(63) Continuation of application No. 16/940,204, filed on Jul. 27, 2020, now Pat. No. 11,694,116.

(51) Int. Cl.
| | | |
|---|---|---|
| *G06N 20/00* | (2019.01) | |
| *G06N 5/04* | (2023.01) | |
| *G07C 5/08* | (2006.01) | |

(52) U.S. Cl.
CPC .............. *G06N 20/00* (2019.01); *G06N 5/04* (2013.01); *G07C 5/0808* (2013.01)

(58) Field of Classification Search
CPC .......... G06N 20/00; G06N 5/04; G06N 3/045; G06N 3/08; G07C 5/0808; G07C 5/008
See application file for complete search history.

(56) References Cited

U.S. PATENT DOCUMENTS 6,609,051 B2   8/2003   Fiechter et al.
6,748,305 B1   6/2004   Klausner et al.
(Continued)

FOREIGN PATENT DOCUMENTS

CN   109191172   1/2019
EP   3296964     3/2018
(Continued)

OTHER PUBLICATIONS

Hrycej et al., "Warranty cost forecast based on car failure data," Proceedings of International Joint Conference on Neural Networks, 7 pgs. Aug. 1007.

(Continued)

*Primary Examiner* — Joseph J Dallo
(74) *Attorney, Agent, or Firm* — BRYAN CAVE LEIGHTON PAISNER LLP

(57) ABSTRACT

A machine learning model is manufactured by a process including retrieving training data, minimizing a loss function, wherein the training data may include labeled or unlabeled data, the machine learning model generating a prediction. A machine learning training/operation server includes a processor and a memory storing instructions that, when executed by the processor, cause the server to retrieve training data, input a training input, analyze the training input to generate a prediction, generate a loss score, and store the trained machine learning model. A method for training a machine learning model includes receiving training data, inputting a training input, analyzing the training input, generating a loss score, and storing the trained machine learning model.

21 Claims, 4 Drawing Sheets

(56) References Cited

U.S. PATENT DOCUMENTS

| | | | |
|---|---|---|---|
| 8,560,438 | B2 | 10/2013 | Hankey et al. |
| 10,510,003 | B1 | 12/2019 | Olabiyi et al. |
| 2008/0103785 | A1 | 5/2008 | Logan |
| 2014/0222820 | A1 | 8/2014 | Mott et al. |
| 2014/0306837 | A1 | 10/2014 | Hauck, III |
| 2018/0068355 | A1 | 3/2018 | Garry et al. |
| 2019/0265768 | A1 | 8/2019 | Zhou et al. |
| 2019/0266573 | A1 | 8/2019 | Radhakrishnan et al. |
| 2019/0286242 | A1 | 9/2019 | Ionescu et al. |
| 2019/0286747 | A1 | 9/2019 | Modarresi et al. |
| 2019/0329790 | A1* | 10/2019 | Nandakumar .... B60W 50/0098 |
| 2019/0332644 | A1 | 10/2019 | Freed et al. |
| 2019/0361918 | A1* | 11/2019 | Rogynskyy ............. H04L 41/14 |
| 2019/0370393 | A1* | 12/2019 | Finch .................. G06F 16/3338 |
| 2019/0370575 | A1 | 12/2019 | Nandakumar et al. |
| 2019/0384303 | A1 | 12/2019 | Muller et al. |
| 2019/0385043 | A1* | 12/2019 | Choudhary ......... G06F 13/4213 |
| 2020/0242000 | A1* | 7/2020 | Khosrowpour ..... G06F 11/3608 |
| 2020/0387819 | A1* | 12/2020 | Rogynskyy ........... H04L 51/212 |
| 2021/0125108 | A1* | 4/2021 | Metzler, Jr. ............. G06F 16/93 |
| 2021/0133439 | A1* | 5/2021 | Mehra ...................... G06N 3/02 |
| 2021/0224695 | A1* | 7/2021 | Stefanov ................ G06N 20/20 |
| 2021/0295175 | A1* | 9/2021 | Kennel ................. G06F 18/214 |
| 2021/0295822 | A1* | 9/2021 | Tomkins ................. G06F 40/30 |

FOREIGN PATENT DOCUMENTS

| | | | |
|---|---|---|---|
| WO | 2018231187 | 12/2018 | |
| WO | 2019235614 | 12/2019 | |
| WO | WO-2021091681 A1 * | 5/2021 | ........... G06N 3/0454 |

OTHER PUBLICATIONS

Kopp et al., "Early reliability estimation in automotive industry," International Conference on Engineering Design ICED11, 8 pgs Aug. 2011.

Owens, K.A., "Brave new wheels? Potential uses for blockchain technology in auto finance," NextGen Financial Services Report, Financial Services Industry Group at Dykema, available online at https://www.nextgenfinancialservicesreport.com/2018/10/brave-new-wheels-potential-uses-blockchain-technology-auto-finance/, 6 pgs Oct. 24, 2018.

SinglePoint, Inc., "SinglePoint Subsidiary ShieldSaver Inks Deal with CarFax; Continuing Expansion of Data Collection for Automotive Blockchain Initiative," available online at https://www.globenewswire.com/news-release/2018/05/01/1493968/0/en/SinglePoint-Subsidiary-ShieldSaver-Inks-Deal-with-Carfax-Continuing-Expansion-of-Data-Collection-for-Automotive-Blockchain-Initiative.html, 4 pgs. 2018.

Yadav, G., "Blockchain writing a new chapter for automotive industry," available online at http://hackernoon.com/blockchain-writing-a-new-chapter-for-automotive-industry-48a8151eec99, 11 pgs 2018.

* cited by examiner

VEHICLE RESILIENCY, DRIVING FEEDBACK AND RISK ASSESSMENT USING MACHINE LEARNING-BASED VEHICLE WEAR SCORING

CROSS-REFERENCE TO RELATED APPLICATIONS

This application is a continuation of U.S. patent application Ser. No. 16/940,204, filed Jul. 27, 2020, the disclosure of which is hereby expressly incorporated by reference herein in its entirety.

FIELD OF THE DISCLOSURE

The present disclosure is generally directed to modeling aspects of vehicle operation, and more particularly, for measuring and predicting vehicle resiliency, providing driving feedback, and performing risk profiling using machine learning-based techniques.

BACKGROUND

The operation of vehicles increasingly generates telematics data. Telematics data include data that represents various aspects of vehicle operation, including the state of vehicle systems (e.g., a braking system, a suspension system, a coolant system, etc.), in addition to vehicle positional and physical information (e.g., vehicle location, course, speed, etc.).

It has recently become possible to derive high quality telematics data via mobile computing devices. However, conventional techniques do not include using telematics data obtained from mobile computing devices for determining vehicle resiliency, for engaging users via driving feedback or for determining risk. Telematics data on its own, without interpretation, is voluminous and resists interpretation by humans.

BRIEF SUMMARY

In one aspect, a machine learning model is stored on a non-transitory computer readable medium, wherein the machine learning model is manufactured by a process comprising retrieving a training data set and training the machine learning model, until a loss score meets a predetermined criteria. The training may include inputting a training input and corresponding label, analyzing the training input using the machine learning model to generate a prediction, and generating the loss score by comparing the prediction to the label using a loss function. The non-transitory computer readable medium may be further manufactured by storing the trained machine learning model on the non-transitory computer readable medium.

In another aspect, a machine learning training and operation server includes one or more processors and a memory storing instructions. When executed by the one or more processors, the instructions may cause the server to retrieve a training data set; input a training input and corresponding label, analyze the training input to generate a prediction, and generate a loss score by comparing the prediction to the label using a loss function; and store, when the loss score meets a predetermined criteria, the trained machine learning model.

In yet another aspect, a computer-implemented method for training a machine learning model includes receiving, via one or more processors, a training data set, inputting to the machine learning model a training input and corresponding label, analyzing the training input using the machine learning model to generate a prediction, and generating a loss score by comparing the prediction to the label using a loss function. The method may include storing, when the loss score meets a predetermined criteria, the trained machine learning model.

Depending upon the embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict preferred embodiments for purposes of illustration only. One skilled in the art will readily recognize from the following discussion that alternative embodiments of the systems and methods illustrated herein may be employed without departing from the principles of the present disclosure.

DETAILED DESCRIPTION

The embodiments described herein relate to, inter alia, methods and systems for measuring and predicting vehicle resiliency, providing driving feedback, and performing risk profiling using one or more machine learning (ML) models. In some embodiments, vehicle telematics data may be generated by a stationary telematics system within a vehicle, and/or via a mobile computing device. The present techniques include measuring and predicting vehicle resiliency by training an ML model to rank vehicles according to the vehicles' respective susceptibility to wear and tear.

The present techniques include simulating wear and tear according to vehicle operator behavior and providing feedback to the vehicle operator. The present techniques include providing risk assessment, by showing how driving behavior is correlated to risk over time.

Inputs to the one or more ML models include vehicle type, vehicle operation behavior, and vehicle age (as expressed as length of ownership and/or odometer). In an embodiment, vehicle type, vehicle operation behavior, and vehicle age are manually adjusted by an operator to simulate partial effects.

In some embodiments, the ML models may analyze historical driving data to simulate how vehicle operation behavior would affect wear and tear of a vehicle the driver has not yet driven, or how present driving behavior would have affected a vehicle driven in the past for which no telematics data are available.

In yet further embodiments, an autoencoder may be used to train a deep learning model that is able to analyze all vehicles in existence.

Exemplary Computing Environment

Figure 1:
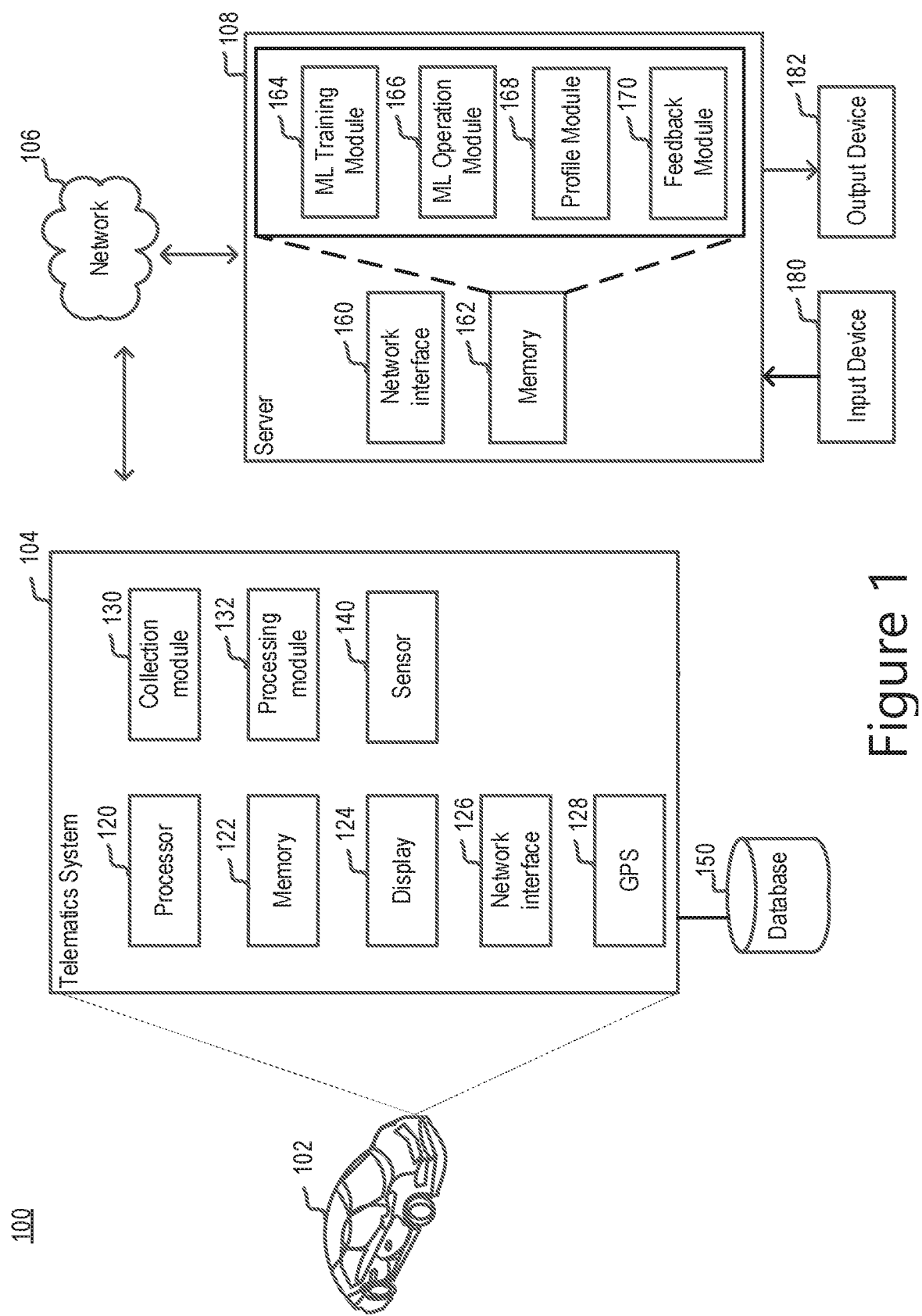
FIG. 1 depicts an exemplary computing environment in which techniques for computing a vehicle wear score using machine learning, and for using the vehicle wear score to model vehicle warranty and vehicle reinsurance, are depicted.

FIG. 1 depicts an example environment 100 for implementing methods and/or systems for measuring and predicting vehicle resiliency, providing driving feedback, and performing risk profiling using one or more machine learning (ML) models. The environment 100 may include a vehicle 102 associated with a telematics system 104, a network 106, and a server 108.

The vehicle 102 and the telematics system 104 are remote from the server 108 and are coupled to the server 108 via the network 106. The network 106 may include any suitable combination of wired and/or wireless communication networks, such as one or more local area networks (LANs), metropolitan area networks (MANs), and/or wide area network (WANs). As just one specific example, the network 106 may include a cellular network, the Internet, and a server-side LAN. As another example, the network 106 may support a cellular (e.g., 4G) connection to a mobile computing device of a user and an IEEE 802.11 connection to the mobile computing device. While referred to herein as a "server," the server 108 may, in some implementations, include multiple servers and/or other computing devices. Moreover, the server 108 may include multiple servers and/or other computing devices distributed over a large geographic area (e.g., including devices at one or more data centers), and any of the operations, computations, etc., described below may be performed in by remote computing devices in a distributed manner.

The telematics system 104 may include hardware and software components implemented in one or more devices permanently and/or temporarily affixed to, or otherwise carried on or within, the vehicle 102. For example, some or all of the components of the telematics system 104 may be built into the dash of the vehicle 102 or affixed elsewhere within the vehicle 102 (e.g., via an onboard diagnostics port of the vehicle 102). In an embodiment, the telematics system 104 may be implemented using a mobile computing device (e.g., a smart phone of the user). The telematics system 104 may include specialized hardware (e.g., one or more sensors) and computer-executable instructions for retrieving/receiving vehicle telematics data from the vehicle 102. In some cases, the telematics system 104 may be implemented using components of the vehicle 102 and a mobile computing device. For example, a vehicle telematics generation module may be included in the vehicle 102 and a vehicle telematics collection module may be included in a mobile computing device of the user, wherein the vehicle telematics collection module receives and/or retrieves a telematics data set from the vehicle telematics generation module. In some embodiments, some or all of the telematics system 104 may be provided by a vehicle rental company, or another operator of a fleet of vehicles (e.g., a ride-sharing company).

In an embodiment, a telematics system in the vehicle 102 may collect a first data set and transmit the first data set to the server 108, while a second telematics system in the mobile computing device of the user may collect and transmit a second data set to the server 108. While FIG. 1 depicts only a single vehicle 102, the vehicle 102 may be in communication with numerous other vehicles 102 similar to the vehicle 102 via the network 106 and/or other networks.

The telematics system 104 may include a processor 120, a memory 122, a display 124, a network interface 126, and a global positioning system (GPS) unit 128. The processor 120 may be a single processor (e.g., a central processing unit (CPU)), or may include a set of processors (e.g., a CPU and a graphics processing unit (GPU)). The telematics system 104 may further include a sensor 140 and a database 150.

It will be appreciated that the present techniques advantageously provide for the collection, processing and analysis of telematics data collected from the mobile device of the vehicle operator. Specifically, in some embodiments, the telematics system 104 is implemented using a mobile device of the user that is carried into the vehicle by the vehicle operator or a passenger. Therefore, the present techniques describe a system architecture that does not need the telematics system 104 to be physically coupled to the vehicle 102. This mobility represents an improvement over conventional computing systems at least because the server 108 is able to receive/retrieve data from the telematics system 104 even when the vehicle is not in an operational state, and the instructions in the memory 122 of the telematics system 104 may be upgraded and/or modified independent of the vehicle itself.

The memory 122 may be a computer-readable, non-transitory storage unit or device, or collection of units/devices, that includes persistent (e.g., hard disk) and/or non-persistent memory components. The memory 122 may store instructions that are executable on the processor 120 to perform various operations, including the instructions of various software applications and data generated and/or used by such applications. In the example implementation of FIG. 1, the memory 122 stores at least a telematics data collection module 130 and a telematics data processing module 132.

Generally, the collection module 130 is executed by the processor 120 to facilitate collection of telematics data from the vehicle 102 and the processing module 132 is executed by the processor 120 to facilitate the bidirectional transmission of telematics data between the telematics system 104 and the server 108 via the network 106 (e.g., sending telematics data collected from the vehicle 102 to the server 108, receiving requests and responses relating to telematics data from the server 108, etc.). The processing module 132 may encode and/or otherwise manipulate (e.g., compress, normalize, filter, etc.) the telematics data. In some embodiments, the collection module 130 may include instructions for converting sensor data to telematics data, or for joining sensor data with telematics data. For example, the collection module 130 may merge data retrieved from a sensor of the vehicle 102 remote from the telematics system 104 with a sensor located locally with respect to the telematics system 104.

The display 124 includes hardware, firmware and/or software configured to enable a user to interact with (i.e., both provide inputs to and perceive outputs of) the telematics system 104. For example, the display 124 may include a touchscreen with both display and manual input capabilities. Alternatively, or in addition, the display 124 may include a keyboard for accepting user inputs, and/or a microphone (with associated processing components) that provides voice control/input capabilities to the user. In some embodiments, the telematics system 104 may include multiple different implementations of the display 124 (e.g., a first display 124 associated with the vehicle 102 and a second display 124 associated with a mobile computing device of the user).

The network interface 126 includes hardware, firmware and/or software configured to enable the telematics system 104 to wirelessly exchange electronic data with the server 108 via the network 106. For example, network interface 126 may include a cellular communication transceiver, a WiFi transceiver, and/or transceivers for one or more other wireless communication technologies (e.g., 4G).

The GPS unit 128 includes hardware, firmware and/or software configured to enable the telematics system 104 to self-locate using GPS technology (alone, or in combination with the services of server 108 and/or another server not shown in FIG. 1). Alternatively, or in addition, the telematics system 104 may include a unit configured to self-locate, or configured to cooperate with a remote server or other device(s) to self-locate, using other, non-GPS technologies (e.g., IP-based geolocation).

In some embodiments, the collection module 130 (or other software stored in the memory 122) provides functionality for collecting telematics data from the vehicle 102. If the telematics system 104 is a unit integrated in the vehicle (e.g., a head unit providing vehicle dashboard integrated navigation technology), for example, the telematics system 104 may include a hardwired connection (e.g., via a Controller Area Network (CAN) bus) to one or more other units of the vehicle 102. As another example, if the telematics system 104 is a smartphone (or smart watch, etc.), the telematics system 104 may couple to one or more units of the vehicle via a wired connection (e.g., an onboard diagnostics connection) or a wireless connection (e.g., Bluetooth, WiFi, etc.). The processing module 132 provides functionality for processing telematics data from the vehicle 102. The processing module 132 may retrieve/receive data from the collection module 132 and/or the database 150. The collection module 130 may collect data from the sensor 140 and may store collected data in the database 150.

The sensor 140 may include one or more sensors associated with the vehicle 102 (e.g., a speedometer sensor, a tire pressure sensor, a brake pad thickness sensor, a suspension ride height sensor, etc.) and/or a mobile device of the user (e.g., an accelerometer in a smartphone). The sensor may provide data (e.g., sensor readings) to one or more applications (e.g., the collection module 130). Many types of sensors may be used, in some embodiments, such as cameras, video cameras, and/or microphones. In an embodiment, the sensor 140 includes the sensors found in a smart phone (e.g., an accelerometer, a gyroscope, a magnetometer, and/or location services data). In some embodiments the sensor 140 may transmit sensor data to one or more mobile computing devices.

The database 150 may be any suitable database (e.g., a structured query language (SQL) database, a flat file database, a key/value data store, etc.). The database 150 may include a plurality of database tables for storing data according to data storage schema. The database 150 may include relational linkages between tables (e.g., one or more foreign keys, primary keys, etc.), and may allow complex data types such as time series data to be stored and queried. The database 150 may include one or more indices.

The server 108 includes a network interface controller (NIC) 160, a memory 162, a ML training module 164, a ML operation module 166, a profile module 168, a feedback module 170 an input device 180, an output device 182 and a database 190. The NIC 160 includes hardware, firmware and/or software configured to enable the server 108 to exchange electronic data (e.g., telematics data) with the telematics system 104 via network 106. For example, NIC 160 may include a wired or wireless router, switch, model, etc. The network architecture of the environment 100 is simplified for explanatory purposes. However, in some embodiments, the network architecture of environment 100 may include other components and/or configurations.

The memory 162 is a computer-readable, non-transitory storage unit or device, or collection of such units/devices, that may include persistent (e.g., hard disk) and/or non-persistent memory components. The memory 162 may store data generated and/or used by the ML training module 164 and/or the ML operation module 166, for example.

The ML training module 164 is generally configured to train one or more machine learning models. The memory 162 may include a module for transmitting ML outputs of the ML training module 162 to the telematics system 104 for display. In some embodiments, the ML model may execute in the telematics system 104. The ML training module 164 may provide one or more inputs as training parameters to the ML models.

The ML training module 164 may initialize, train, and/or store any type of machine learning model, including supervised models and/or unsupervised models. For example, the ML training module 164 may train any suitable type of artificial neural network, such as a convolutional neural network, recurrent neural network, generative adversarial network or feed-forward neural network, for example. The neural network may include a number (e.g., hundreds or thousands) of nodes (i.e., neurons) arranged in multiple layers, with each node processing one or more inputs (e.g., from the preceding layer, if any) to generate a decision, prediction, or other output. In some embodiments, the machine learning model may be tree-based.

The ML training module 164 may retrieve historical data, such as claims data of an insurer. The claims data may represent electronic insurance claims filed by insurance policyholders, and may include information relating to insured assets, such as vehicle types, makes, models, etc. The historical claims data may include data related to outcomes (e.g., a collision, property damage, an injury, etc.). The ML training module 164 may use the historical data to train the one or more models.

The ML operation module 166 may be configured for loading, initializing, executing and receiving output from the one or more ML models trained by the ML training module 164, or by other training modules/programs. The ML operation module 166 may be located in the telematics system 104, in some embodiments. Locating the operation module 166 in the telematics system 104 advantageously allows the environment 100 to offload machine learning model operation and data processing to edge/consumer devices, and allows inputs (e.g., operational inputs) and outputs (e.g., operational outputs) of the ML model operated by the ML operation module 166 to be processed and displayed to the user with decreased latency and decreased use of server-side resources. Locating the operation module 166 in the telematics system further advantageously allows use of the trained ML model when the telematics system 104 is offline (i.e., when the telematics system 104 cannot communicate with the network 106).

The vehicle operator profile module 168 may be configured to generate vehicle operator profiles. Specifically, the vehicle operator profile may associate an operator with one or more vehicles and telematics data sets. For example, the vehicle operator profile module 168 may maintain an association between a particular vehicle operator (e.g., John), one or more vehicles (e.g., a 2018 Ford Explorer) and telematics data for a time period (e.g., 2019). The vehicle operator profile module 168 may store the associated data in a database such as the database 190. In this way, another module (e.g., the ML training module 164) may query the database 190 to retrieve a specific slice of telematics data corresponding to a particular vehicle operator's operation of a particular vehicle.

The feedback module 170 may include instructions for generating one or more notifications for display in a mobile computing device of the vehicle operator, such as the display 124 of FIG. 1. The feedback module 170 may include additional instructions for transmitting the notification and for receiving inputs from the vehicle operator (e.g., an acknowledgement message, an input parameter, etc.). The feedback module 170 may process the inputs from the vehicle operator.

The input device 180 and the output device 182 include hardware, firmware and/or software configured to respectively enable the user to provide inputs to and perceive outputs of the telematics system 104. In an embodiment, the input device 180 and output device 182 may be combined and implemented as a touchscreen with both display and manual input capabilities. Alternatively, or in addition, the input device 180 may include a keyboard for accepting user inputs, and/or a microphone (with associated processing components) that provides voice control/input capabilities to the user. The output device 182 may include one or more display screens. In some embodiments, the server 108 may include multiple different implementations of the input device 180 and the output device 182.

The database 190 may be any suitable database (e.g., a structured query language (SQL) database, a flat file database, a key/value data store, etc.). The database 190 may include a plurality of database tables for storing data according to data storage schema. The database 190 may include relational linkages between tables (e.g., one or more foreign keys, primary keys, etc.), and may allow complex data types such as time series data to be stored and queried. The database 190 may include one or more indices. The database 190 may store profile information, training data, trained ML models/weights.

Exemplary Machine Learning Model Training

Training of various ML models will now be discussed with respect to the environment 100 of FIG. 1. The ML training module 164 may include computer-executable instructions for training one or more ML model using telematics data. In general, the ML module 164 may train one or more ML models by establishing a network architecture, or topology, and adding layers that may be associated with one or more activation functions (e.g., a rectified linear unit, softmax, etc.), loss functions and/or optimization functions. One or more types of artificial neural networks may be employed, including without limitation, recurrent neural networks, convolutional neural networks, and/or deep learning neural networks. Data sets used to train the artificial neural network(s) may be divided into training, validation, and testing subsets, and these subsets may be encoded in an N-dimensional tensor, array, matrix, or other suitable data structures. In supervised learning, training may be performed by iteratively training the network using labeled training samples. The labels may represent desired (e.g., labeled) outputs for inputs that are similar to the labeled training samples. In this way, the network is able to learn to make predictions or identify features of de novo inputs that were not used for training.

Training of the artificial neural network may produce byproduct weights, or parameters which may be initialized to random values, and/or manually adjusted. The weights may be modified as the network is iteratively trained, by using one of several gradient descent algorithms, to reduce loss and to cause the values output by the network to converge to expected, or "learned", values. In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. In another embodiment, for example, a Bayesian model may be used to train the ML model.

Figure 2:
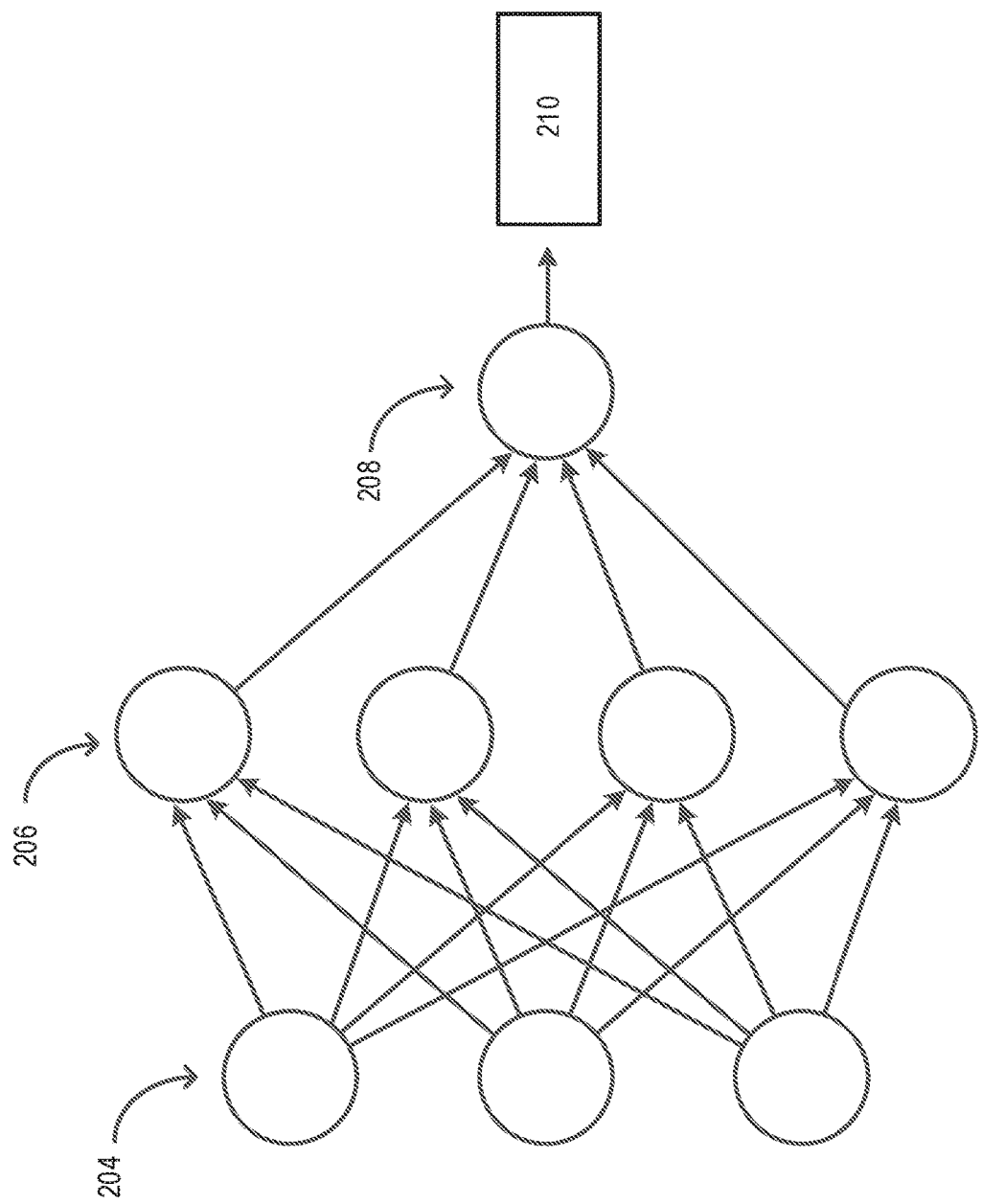
FIG. 2 depicts an exemplary artificial neural network, according to one embodiment.

FIG. 2 depicts an example ANN 200. The ANN 200 may be initialized (i.e., created) and trained by the machine learning training module 164 of FIG. 1, in some embodiments. The ANN 200 may execute in the memory of a computing device (e.g., the server 108) and may analyze one or more data set. The data sets may be labeled or unlabeled. For example, a data set may correspond to labeled telematics data or unlabeled telematics data. The ANN 200 may be operated by the ML operation module 164 of FIG. 1, for example.

The ANN 200 includes an input layer 204, one or more hidden layers 206, and an output layer 208. Each of the layers in the example neural network 200 may include an arbitrary number of neurons. For example, the input layer 204 is depicted as comprising three neurons, however, any number of neurons may be included in the input layer 204. Each of the one or more hidden layers 206 may respectively include any number of neurons. The respective neurons comprising the hidden layers 206 may be configured in different ways. For example, the neurons may be chained together linearly and pass output from one to the next, or may be networked together such that the neurons communicate input and output in a non-linear way. In general, it should be understood that many configurations and/or connections different from those shown in FIG. 2 are possible.

The ANN 200, or another model, may be trained to compute various information. For example, the ML training module 164 may train a first ML model to calculate a vehicle wear score, a second ML model to simulate wear and tear according to vehicle operator behavior, a third ML model to generate feedback for the vehicle operator, and a fourth ML model to generate a risk assessment demonstrating showing how driving behavior is correlated to risk over time.

Figure 3:
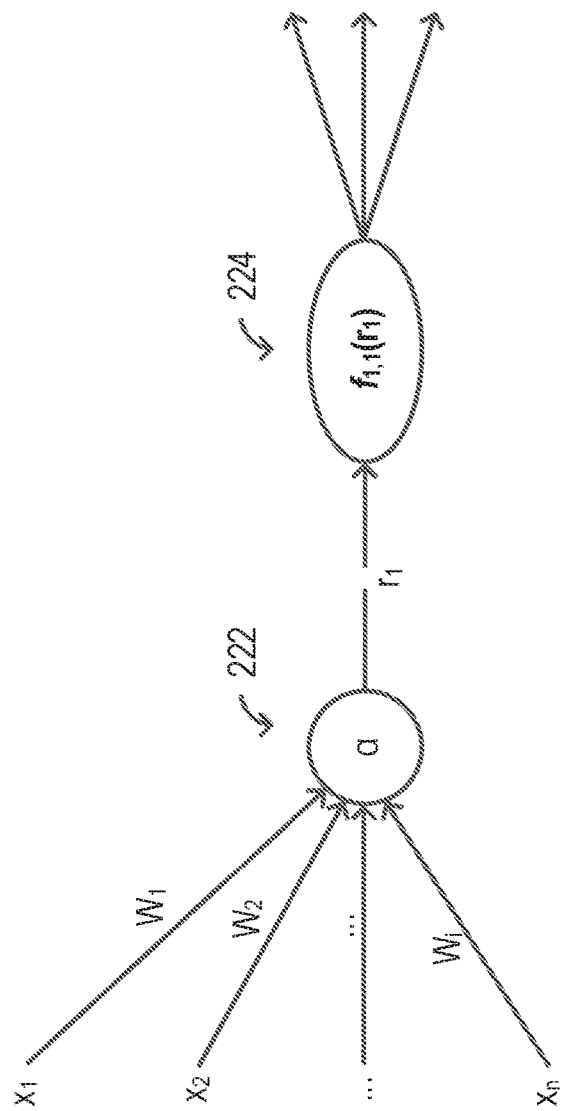
FIG. 3 depicts an exemplary neuron of the artificial neural network of FIG. 2, according to one embodiment and scenario.

The input layer 204 may correspond to a large number of input parameters (e.g., one million inputs), in some embodiments, and may be analyzed serially or in parallel. Further, various neurons and/or neuron connections within the neural network 200 may be initialized with any number of weights and/or other training parameters, e.g., as depicted in FIG. 3 (discussed further below). Each of the neurons in the hidden layers 206 may analyze one or more of the input parameters from the input layer 204, and/or one or more outputs from a previous one or more of the hidden layers, to generate a decision or other output. In some embodiments, multiple ANNs 200 may be connected together to form an ensemble ANN. In yet further embodiments, an ANN of a different type (e.g., a convolutional neural network, or CNN) may be coupled to the ANN 200, for example, to analyze image-based input.

The output layer 208 may include one or more outputs 210, each indicating a prediction or result. In some embodiments and/or scenarios, the output layer 208 includes only a single output (e.g., a number predicted to be the vehicle wear score). In some embodiments, feedback from a subsequent or previous neuron may be used to identify neurons that are of lesser relevance to the determination of the trained outputs of the neural network 200. Further, once the neural network 200 is trained, some useless (or less useful) neurons may be bypassed entirely to optimize the resource consumption of the neural network 200 and/or to improve the predictive capabilities of the neural network 200.

FIG. 3 depicts an example neuron 220 that may correspond to one of the neurons in the hidden layers 206 of FIG. 2, in an embodiment. For example, the neuron 220 may correspond to the first neuron of the input layer 204 of FIG. 2. Each of the inputs to the neuron 220 may be weighted according to a set of weights W1 through Wi, determined during the training process (for example, if the neural network 200 is a recurrent neural network) and then applied to a node 222 that performs an operation α. The operation α may include computing a sum, a difference, a multiple, or a different operation. In some cases, the initial weights may be manually adjusted.

In some embodiments, weights are not determined for some inputs, notwithstanding the fact that FIG. 3 depicts all inputs X1 through Xn as being associated with a weight. Further, the neuron 220 may not consider some inputs as relevant to the determination of outputs, and may thus ignore them (e.g., by setting the respective weight to zero). The sum of the weighted inputs, r1, may be input to a function 224, labeled in FIG. 3B as f1,1(r1) which may represent any suitable functional operation on r1. As depicted in FIG. 3, the output of the function 224 may be provided to a number of neurons of a subsequent layer or as the output 210 of the neural network 200.

It should be appreciated that in other embodiments or configurations, the neuron 220 may be arranged differently than the depiction in FIG. 3. For example, the node 222 may be omitted and/or the function 224 may work directly with the inputs X1 through Xn. There may be a lack of any weighting, and the operation α may comprise a transforming function, such as taking an absolute value or conversion to a natural number, for example. The exact manner in which the neural network 200 constitutes and uses layers, and neurons within the layers, may vary depending on the nature of the input data and/or the desired output (e.g., ground truth). The structure of the individual layers and/or neurons, including without limitation the type, number, weightings, and so on, may affect the manner in which the overall neural network 200 functions and the purpose for the network.

For example, in some embodiments, vehicles may be grouped by vehicle identifiers (e.g., a key comprising the vehicle year, the vehicle make, and the vehicle model). In other embodiments, vehicles may be grouped according to other characteristics. For example, in an embodiment, the ML training module 164 may train an unsupervised learning model to perform cluster analysis, wherein the cluster analysis includes grouping vehicles according to vehicle features/attributes (e.g., engine type, square footage, vehicle tonnage, stopping speed, etc.). Such groupings may be further analyzed.

It will be appreciated by those of skill in the art that the present techniques may include the application of machine learning techniques other than artificial neural networks. For example, in one embodiment, a tree-based machine learning model is used that does not include any weights. Such a machine learning model may be a decision tree (e.g., a classification tree, a regression tree, a boosted tree, a random forest classifier, etc.). In still further embodiments, other techniques may be used, such as support vector machines, regression, Bayesian modeling, and/or genetic algorithms.

As noted above, the machine learning modeling may be supervised or unsupervised, and other types of learning may be implemented, such as reinforcement learning, self-learning, etc. Specifically, the ML training module 164 may train one or more machine learning models in addition to, or instead of, the ANN 200.

Exemplary Vehicle Wear Score Modeling Embodiment

In operation, the present techniques may train and operate one or more supervised machine learning models to accept a target (e.g., losses attributable to wear and tear) and map features (e.g., special interaction between type of vehicle, driving behavior, length of ownership, etc.) to that target. Specifically, the one or more neurons of the input layer 204 may correspond respectively to input parameters such as values measured from one or more sensors of a vehicle. For example, the collection module 130 may obtain telematics data and/or sensor data, and the processing module 132 may extract from collected data a set of sensor values of the vehicle. The input parameters may be analyzed by the one or more hidden layers 206 and a wear score generated as the output 210. The wear score may be an integer value or a real number (e.g., a value from 0.0 to 1.0). Training an ML model to generate a wear score may include analyzing labeled wear scores corresponding to other vehicles.

For example, a training data set may include a data structure (e.g., a hash table), wherein the key of the hash table is a vehicle identification number (VIN) of the vehicle, a first data value is a set of vehicle scores (e.g., by system or by individual component), and a second data value is a vehicle wear score corresponding to the aggregate vehicle wear score of the vehicle. To train a wear score ML model, the ML training module 164 may, for example, iterate over the hash table, inputting each of the sets of vehicle component scores as training parameters, and each respective vehicle wear score as a label parameter to the wear sore ML model, until a predetermined accuracy is achieved. The ML training module 164 may determine the accuracy of the model by minimizing a loss function.

Once the wear score ML model is trained, a module (e.g., the ML operation module 166) may provide a de novo set of individual vehicle component scores to the trained wear score ML model (i.e., operational inputs) to obtain a wear score corresponding to the vehicle from which the collection module 130 collected the vehicle component scores. The wear score predicted by the wear score ML model may be stored, in association with the VIN in an electronic database, such as the database 190, and/or provided to another component (e.g., another ML model for training/operation).

The present techniques include several advantageous aspects, including that the present techniques work on every vehicle, using a solution that does not need configuration for each specific vehicle. Further, by combining key data elements, the present techniques generate outputs (e.g., resiliency of vehicle, feedback on driving behaviors, and how actions over time contribute to increase in risk of the vehicle over time). These outputs are unique to the modeling approaches disclosed herein and are not available using conventional techniques.

Exemplary Wear and Tear Simulation Embodiment

For example, the ML training module 164 may retrieve a training data set from a database associated with the server 108. The training data set may include a plurality of individual records, wherein each record includes a vehicle type, a set of vehicle operation behaviors, and a vehicle age (as expressed as length of ownership and/or odometer). Each of the training data set records may correspond to a particular vehicle operator, and may be associated with a profile record, also stored in the database.

The ML training module 164 may analyze the training data set to build a model for analyzing a vehicle operator's vehicle operation behavior with respect to a first vehicle to simulate the vehicle operator's vehicle operation behavior with respect to a second vehicle. The ML training module may use the simulated vehicle operation behavior to predict wear and tear with respect to the second vehicle. The present techniques advantageously improve prior systems because the simulated vehicle operation behavior is determined without needing sensors in the second vehicle.

In some embodiments, the ML models may analyze historical driving data to simulate how vehicle operation behavior would affect wear and tear of a vehicle the driver has not yet driven, or how present driving behavior would have affected a vehicle driven in the past for which no telematics data are available.

Exemplary Vehicle Operator Feedback Embodiment

In an embodiment, the present techniques are used to train an ML model may to accept telematics data corresponding to a vehicle operator (e.g., braking events) and output a braking profile based at least in part upon analyzing the braking information, wherein the ML model is trained using training data corresponding to the braking behavior of other vehicle operators.

For example, an unsupervised ML model may be used to group a set of vehicle operators according to respective vehicle operation behaviors. The unsupervised ML model may quantify vehicle operation behaviors such as hard braking, speed, and acceleration. The unsupervised ML model may, in some embodiments, determine whether the vehicle operator is speeding by analyzing mapping data. Once the unsupervised ML model has grouped the vehicle operators into categories, the ML operation module 166 may operate a second ML model to analyze telematics data of a vehicle operator not included in the training data set to determine which category the vehicle operator not included in the training data set most closely resembles. In this way, the present techniques are able to gauge the risk level of the vehicle operator, relative to other vehicle operators.

The feedback module 170 may include instructions for providing feedback to the vehicle operator in response to the vehicle operator's categorization. For example, when the vehicle operator is found to be in a higher risk vehicle operation behavior category, the feedback module 170 may generate a notification and transmit the notification to the telematics system 104 for display. The notification may Exemplary Risk Assessment Embodiment In an embodiment, transfer learning may be used to simulate vehicle operation behavior and wear outcomes. For example, each of a plurality of vehicle operators may operate a respective vehicle. A first vehicle operator in the plurality of vehicle operators may operate a first vehicle lightly as measured by, for example, mileage, braking, acceleration, and overall wear. A second vehicle operator in the plurality of vehicle operators may operate the second vehicle so as to cause dramatically more wear by, for example, more mileage, more braking, more acceleration, and generally more wear-causing behaviors.

In some embodiments, mileage may be determined by reference to third party data sources (e.g., an application programming interface (API)) or an electronic database.

Respective instances of the telematics system 104 of FIG. 1 may be embodied in the respective mobile devices of the plurality of vehicle operators, for example. The respective telematics systems 104 collect telematics data of the two vehicle operators and store the telematics data in association with user profiles of the two vehicle operators. For example, the two vehicle operators may be customers of an insurer who download a computer application embodying the telematics system 104 into their respective smart phones.

The ML training module 164 may train a transfer ML model using the vehicle operation behavior and wear outcomes of the plurality of vehicle operators. Specifically, the ML training module 164 may train the transfer ML model to predict the wear to a vehicle by a vehicle operator not in the plurality of vehicle operators, based at least in part upon the similarity of the vehicle operator's vehicle operation behavior to that of the plurality of vehicle operators. The transfer ML model may also predict the wear that one of the plurality of vehicle operators will cause to a new vehicle that the vehicle operator has not operated previously, based at least in part upon the collected wear outcomes. Therefore, the transfer model may predict or estimate wear and tear (e.g., likelihood of brakes being worn thin) on first set of identical cars based at least in part upon difference in wear/tear. In some embodiments, other conditions regarding the plurality of vehicle operators may be used as training inputs to the transfer ML model, such as accident information, which allows the link between driving behavior to collisions to be seen.

The present techniques may analyze the plurality of vehicle operators further to determine whether risk is due to negative vehicle operation behavior or contributions from wear and tear. Specifically, by analyzing the length of ownership of vehicles within the plurality of vehicle operators, the present techniques may determine that in general, vehicle operators with a longer length of ownership are involved in more collisions. An ML model may be trained that normalizes the plurality of vehicle operators according to length of ownership, to determine the partial effect of vehicle operation behavior on wear and tear, and how the partial effect is correlated to losses. The trained model may accept as inputs vehicle operation behavior, length of ownership (e.g., odometer), and vehicle information and output an estimate of wear and tear to the vehicle. For example, the wear may be a vehicle wear score, a set of wear scores respective to particular components (e.g., brakes) or systems (e.g., cooling system). In particular, in some embodiments, a generalized linear model (GLM) may be used to manually specify interactions and to multiply factors together, to estimate how each factor is correlated to a loss (e.g., the likelihood of a collision).

A user may adjust parameters of inputs to the trained model to assist the user in reliability engineering. For example, with the trained model, the user may change the value of the length of ownership from one year to ten years, to see how the longer ownership duration influences predicted losses. The user may modify the vehicle type to determine how the probability of collision may increase or decrease. Each vehicle in existence may be ranked for comparative analyses. The user may also input driving behaviors, to determine how wear and tear, and thus the probability of collision, changes. The user may program simulations to automatically provide inputs to the trained ML model, for determining the unique wear/tear to vehicles by varying length of ownership, for measuring the resilience of vehicle types to wear/tear by changing their types. Feedback may be provided to users based at least in part upon the effect of modifying vehicle operation behaviors. For example, the message may include a note to the user that that by avoiding hard braking, wear and tear to the brake pads of the vehicle will be decreased by, for example, 60%. In yet further embodiments, an autoencoder may be used to train a deep learning model that is able to analyze all vehicles in existence. Specifically, a deep learning model may be trained to encode vehicle information into a smaller universe (e.g., into N-digit encoding). In this way, the N-digit encoding can express any possible vehicle that may exist.

Exemplary Computer-Implemented Methods

Figure 4:
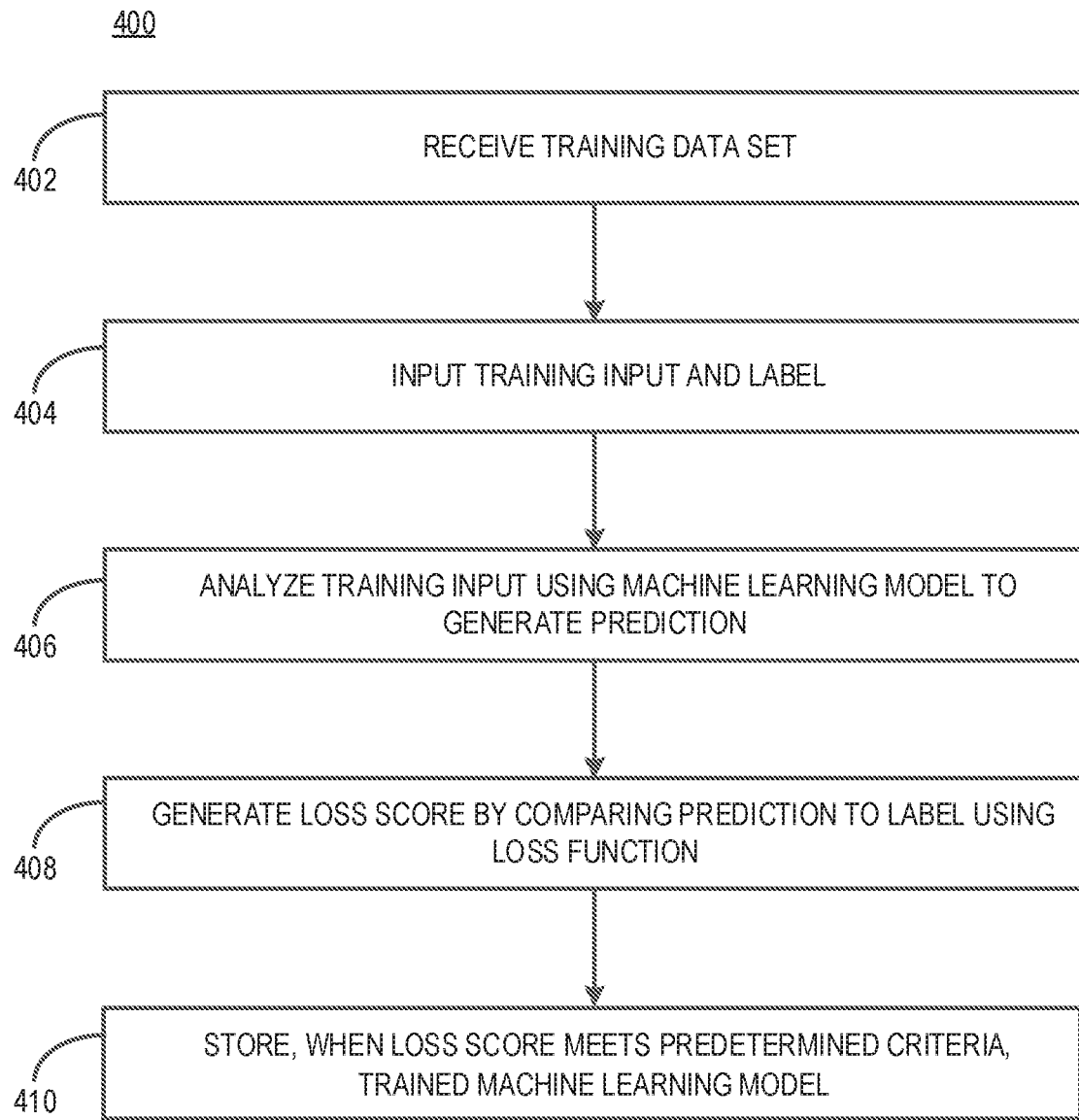
FIG. 4 depicts an exemplary computer-implemented method, according to one embodiment and scenario.

FIG. 4 depicts and exemplary method 400 for training a machine learning model. The method 400 may include retrieving/receiving a training data set (block 402). The training data set may correspond to telematics data, profile data, and/or vehicle data. For example, the training data set may be received/retrieved from the database 190. The method 400 may include inputting the training data set into a machine learning model (block 404). In some embodiments, the method 400 may include inputting labeled data.

The method 400 may include analyzing the training input to generate a prediction (block 406). The method 400 may include generating the loss score by comparing the prediction to the label using a loss function (block 408). In embodiments wherein the machine learning model is an artificial neural network, the method 400 may include back-propagating the loss score to update the set of weights, wherein the method 400 trains the model repeatedly to adjust a set of weights of the machine learning model, until a loss score meets a predetermined criteria. Training, discussed in further detail above, may be carried out by the ML training module 164 of Figure. It should be appreciated that in some cases, the machine learning model may be trained without using any labeled information (e.g., in unsupervised learning). Further, in some embodiments, the method 400 may include storing a set of weights as the weights of the trained machine learning model. The method 400 may include storing the trained machine learning model once the loss score meets a predetermined criteria (block 410). Specifically, the ML training module 164 may serialize and store the weights of the network in an electronic database or on a disk (e.g., the memory 162) as discussed above. Another module (e.g., the ML operation module 168) may operate the machine learning model (e.g., using the stored weights and/or other parameterization/initialization data, such as hyperparameters).

The method 400 may train one or more ML model for a variety of tasks, including calculating a vehicle wear score, simulating wear and tear according to vehicle operator behavior, generating feedback for the vehicle operator, and generating a risk assessment demonstrating showing how driving behavior is correlated to risk over time. Once the method 400 has trained the machine learning model, the method 400 may include receiving and processing operational telematics information (e.g., from a mobile device of a user) as discussed above.

For example, historical data may demonstrate that a given percentage of collisions are due to vehicle maintenance problems (mechanical failure due to wear and tear). Further, wear and tear may be substantially affected by individual vehicle operation behaviors. Thus, vehicle operation behaviors may be used to train an ML model to predict risk pricing. A target variable of such an ML model is whether the vehicle will be involved in a collision due to a failure attributable to wear and tear. It should be appreciated that in an embodiment, telematics data are not used to train such a model. Rather, an encoding may include a type of the vehicle (e.g., year, make, and model), driving behaviors of the vehicle operator (e.g., braking events, and speeding) and the length of ownership (e.g., odometer or time). Such information may be used as features for the model to predict whether will be involved in a claim attributable to normal wear and tear.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed:

1. A method implemented by one or more processors, the method comprising:
retrieving a machine learning model;
wherein the machine learning model is trained by a training dataset comprising a hash table until a loss score meets a predetermined criteria by at least:
analyzing a training input of the training dataset using the machine learning model to generate a training prediction;
generating, using a loss function, the loss score by comparing the training prediction to a corresponding label of the training dataset for the training input; and
modifying at least one of one or more weights of the machine learning model based at least in part upon the loss score; and
analyzing an operational input using the machine learning model, as trained, to obtain a prediction;
wherein:
the operational input includes a set of component wear scores of a vehicle; and
the prediction includes an aggregated wear score of the vehicle generated by analyzing the set of component wear scores.

2. The method of claim 1, wherein:
the operational input includes telematics data corresponding to one or more vehicles operated by an operator of the vehicle, vehicle type data, or vehicle age; and
the prediction includes an estimated wear of the vehicle.

3. The method of claim 2, wherein the telematics data includes data collected by one or more sensors, the one or more sensors including at least one selected from a group consisting of a speedometer sensor, a tire pressure sensor, a brake pad thickness sensor, a suspension ride height sensor, an accelerometer, a gyroscope, a magnetometer, and a position sensor.

4. The method of claim 3, further comprising:
associating a vehicle operator with one or more telematics datasets in the telematics data; and
generating a vehicle operator profile based on the association.

5. The method of claim 1, wherein the operational input is adjusted programmatically or by a user to simulate a partial effect.

6. The method of claim 1,
wherein the operational input includes telematics data, and
wherein the analyzing the operational input using the trained machine learning model, as trained, to obtain the prediction includes analyzing the telematics data to categorize collision risk of a vehicle operator of the vehicle.

7. The method of claim 6, further comprising:
transmitting a feedback notification to the vehicle operator, the feedback notification including a warning in regard to the collision risk and a recommendation for reducing the collision risk.

8. The method of claim 7, wherein the trained machine learning model, as trained, includes a first machine learning model to determine a vehicle wear score and a second machine learning model to generate a risk assessment.

9. A computing device comprising:
one or more processors; and
one or more memories storing instructions that, when executed by the one or more processors, cause the one or more processors to:
retrieve a machine learning model;
wherein the machine learning model is trained by a training dataset comprising a hash table until a loss score meets a predetermined criteria by at least:
analyzing a training input of the training dataset using the machine learning model to generate a training prediction;
generating, using a loss function, the loss score by comparing the training prediction to a corresponding label of the training dataset for the training input; and
modifying at least one of one or more weights of the machine learning model based at least in part upon the loss score; and
analyze an operational input using the machine learning model, as trained, to obtain a prediction;
wherein:
the operational input includes a set of component wear scores of a vehicle; and
the prediction includes an aggregated wear score of the vehicle generated by analyzing the set of component wear scores.

10. The computing device of claim 9, wherein:
the operational input includes telematics data corresponding to one or more vehicles operated by an operator of the vehicle, vehicle type data, or vehicle age; and
the prediction includes an estimated wear of the vehicle.

11. The computing device of claim 10, wherein the telematics data includes data collected by one or more sensors, the one or more sensors including at least one selected from a group consisting of a speedometer sensor, a tire pressure sensor, a brake pad thickness sensor, a suspension ride height sensor, an accelerometer, a gyroscope, a magnetometer, and a position sensor.

12. The computing device of claim 11, wherein the instructions further cause the one or more processors to:
associate a vehicle operator with one or more telematics datasets in the telematics data; and
generate a vehicle operator profile based on the association.

13. The computing device of claim 9, wherein the instructions further cause the one or more processors to:
receive telematics data corresponding to one or more vehicles operated by an operator of the vehicle, vehicle type data, or vehicle age; and
generate an estimated wear of the vehicle.

14. The computing device of claim 13, wherein the operational input includes the telematics data, and
wherein the analyzing the operational input using the machine learning model, as trained, to obtain the prediction includes to analyze the telematics data to categorize collision risk of a vehicle operator of the vehicle.

15. The computing device of claim 14, wherein the instructions further cause the one or more processors to:

transmit a feedback notification to the vehicle operator, the feedback notification including a warning in regard to the collision risk and a recommendation for reducing the collision risk.

16. The computing device of claim 15, wherein the machine learning model, as trained, includes a first machine learning model to determine a vehicle wear score and a second machine learning model to generate a risk assessment.

17. A method implemented by one or more processors, the method comprising:
retrieving a machine learning model;
wherein the machine learning model is trained by a training dataset comprising a hash table until a loss score meets a predetermined criteria by at least:
analyzing a training input of the training dataset using the machine learning model to generate a training prediction;
generating, using a loss function, the loss score by comparing the training prediction to a corresponding label of the training dataset for the training input; and
modifying at least one of one or more weights of the machine learning model based at least in part upon the loss score;
analyzing an operational input using the trained machine learning model, as trained, to obtain a prediction;
wherein:
the operational input includes a set of component wear scores of a vehicle; and
the prediction includes an aggregated wear score of the vehicle generated by analyzing the set of component wear scores;
wherein the operational input further includes telematics data;
wherein the analyzing the operational input using the machine learning model, as trained, to obtain the prediction includes analyzing the telematics data to categorize collision risk of a vehicle operator of the vehicle; and
transmitting a feedback notification to the vehicle operator, the feedback notification including a warning in regard to the collision risk and a recommendation for reducing the collision risk.

18. The method of claim 17, wherein:
the telematics data corresponds to one or more vehicles operated by an operator of the vehicle, vehicle type data, or vehicle age; and
the prediction includes an estimated wear of the vehicle.

19. The method of claim 18, wherein the telematics data includes data collected by one or more sensors, the one or more sensors including at least one selected from a group consisting of a speedometer sensor, a tire pressure sensor, a brake pad thickness sensor, a suspension ride height sensor, an accelerometer, a gyroscope, a magnetometer, and a position sensor.

20. The method of claim 19, further comprising:
associating the vehicle operator with one or more telematics datasets in the telematics data; and
generating a vehicle operator profile based on the association.

21. A system comprising:
  a means for storing data thereon; and
  a means for performing operations comprising:
    retrieving a machine learning model;
      wherein the machine learning model is trained by a training dataset comprising a hash table until a loss score meets a predetermined criteria by at least:
        analyzing a training input of the training dataset using the machine learning model to generate a training prediction;
        generating, using a loss function, the loss score by comparing the training prediction to a corresponding label of the training dataset for the training input; and
        modifying at least one of one or more weights of the machine learning model based at least in part upon the loss score; and
    analyzing an operational input using the machine learning model, as trained, to obtain a prediction;
      wherein:
        the operational input includes a set of component wear scores of a vehicle; and the prediction includes an aggregated wear score of the vehicle generated by analyzing the set of component wear scores.

* * * * *